United States Patent
Wilson

[19]

[11] Patent Number: 6,158,165
[45] Date of Patent: Dec. 12, 2000

[54] TRAP FOR INSECTS, VERMIN AND SIMILAR SUBJECTS

[76] Inventor: Henry Allen Wilson, 4870 Palm Beach Canal Rd., West Palm Beach, Fla. 33415

[21] Appl. No.: 09/340,270

[22] Filed: Jun. 25, 1999

[51] Int. Cl.[7] .......................... A01M 1/10; A01M 23/08; A01M 69/06
[52] U.S. Cl. .................................. 43/66; 43/65; 43/100; 43/107; 43/121
[58] Field of Search ................................... 43/58, 65, 66, 43/100, 102, 107, 121, 122

[56] References Cited

U.S. PATENT DOCUMENTS

| | | | |
|---|---|---|---|
| 38,277 | 4/1863 | Bassett | 43/122 |
| 149,918 | 4/1874 | Clough | 43/65 |
| 218,175 | 8/1879 | Hollingshead | 43/65 |
| 722,143 | 3/1903 | Raymond | 43/122 |
| 858,157 | 6/1907 | Day | 43/121 |
| 862,079 | 7/1907 | Lenthier | 13/122 |
| 1,618,513 | 2/1927 | Coghill | 43/66 |
| 1,682,575 | 8/1928 | Leon et al. | 43/107 |
| 1,941,659 | 1/1934 | Coleman | 43/122 |
| 2,119,828 | 6/1938 | Nordenstam | 43/100 |
| 2,162,623 | 6/1939 | Livingston | 43/65 |
| 2,424,421 | 7/1947 | Temme | 43/121 |
| 2,569,833 | 10/1951 | Simpson, Sr. | 43/100 |
| 2,741,066 | 4/1956 | Conway | 43/121 |
| 4,452,006 | 6/1984 | Steck et al. | 43/122 |
| 4,608,774 | 9/1986 | Sherman | 43/121 |
| 5,682,706 | 11/1997 | Altenburg | 43/122 |

*Primary Examiner*—Darren W. Ark
*Attorney, Agent, or Firm*—Quarles & Brady

[57] ABSTRACT

A trap for capturing insects and other vermin, such as cockroaches, including a baited container having an opening at the top provided with a vertically arranged smooth-walled tube, which can be oiled to make it more difficult for the vermin to escape. A retaining apparatus can be provided allowing the entrance, but not the exit, of insects. The retaining apparatus can be a flexible ring which has a plurality of interleaving, flexible wires pointing conically into the interior of the container. Insects can push aside the wires in one direction to enter the container, but are prevented from escaping from the interleaved wires. Alternatively, the retaining apparatus can consist of two members movably biased together at one end such as to allow easy separation of the two members by a subject insect or vermin between the two members. Once separated, the members provide entrance to the container. Separation and opening of the members from within the container is made difficult by the bias of the members and necessity of the subject grasping both members to effect separation.

8 Claims, 2 Drawing Sheets

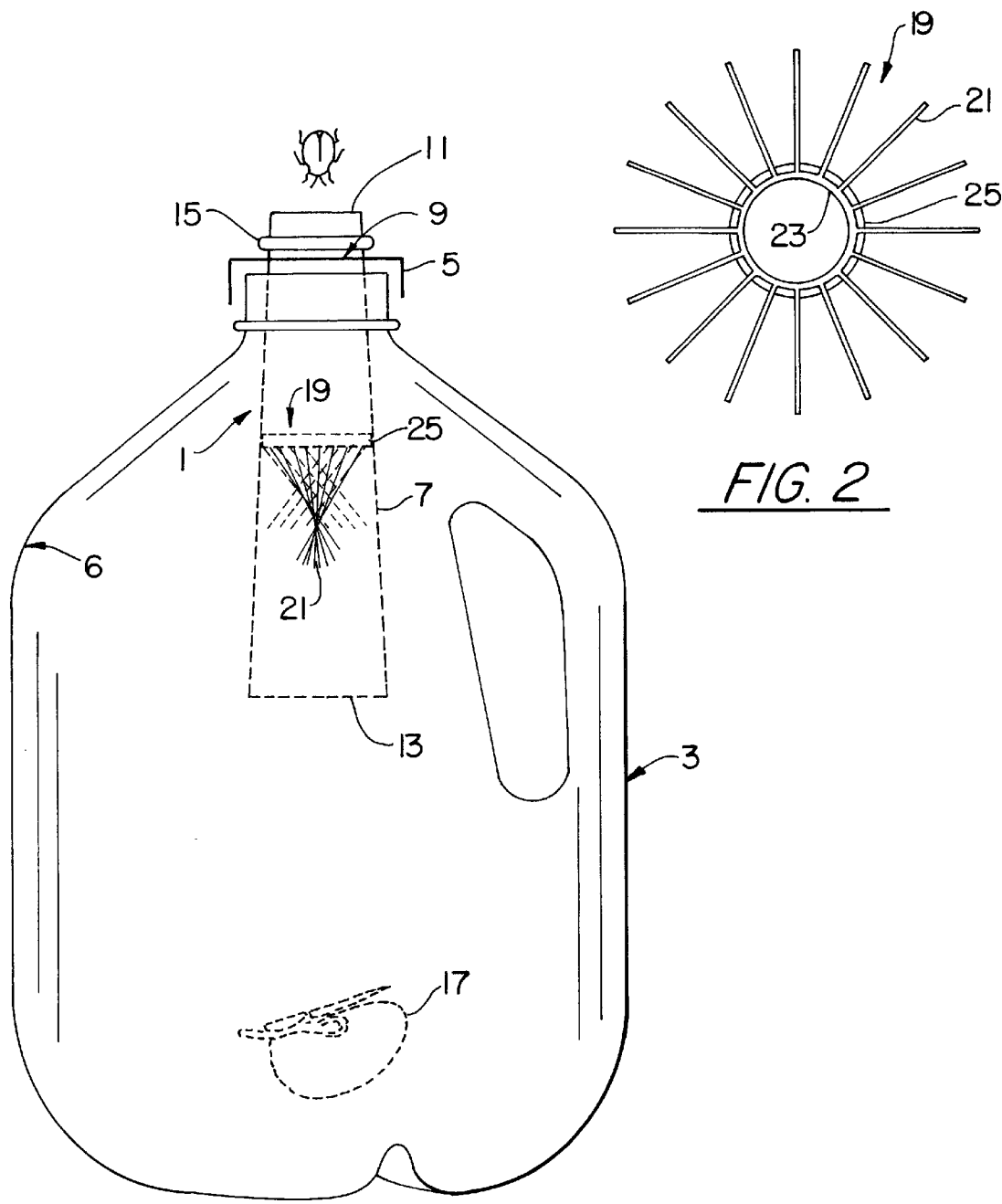

TRAP FOR INSECTS, VERMIN AND SIMILAR SUBJECTS

BACKGROUND OF THE INVENTION

1. Field of the Invention

The present invention relates to traps for insects, vermin and similar subjects. The invention more particularly relates to poison-free traps for such subjects.

2. Discussion of the Prior Art

A number of trapping devices have been developed which utilize containers having entry ways which allow insects to access the interior of the container but resist the escape of the trapped insects through the passage. Conical entry ways in various configurations are shown by Raymond, U.S. Pat. No. 722,143; Day, U.S. Pat. No. 858,157; and Temme, U.S. Pat. No. 2,424,421. These known devices generally rely on a small opening, but if the subject is able to find its way back to the interior opening of the entry way, escape may be easily carried out.

SUMMARY OF THE INVENTION

It is an object of the invention to provide a trap with improved trapping capabilities.

It is another object of the invention to provide a trap which does not depend on poison for its operation.

It is a further object of the invention to provide a trap which can utilize common household containers to minimize expense.

It is yet another object of the invention to provide a trap having reusable parts.

These and other objects of the invention are provided by a trap for insects, vermin and similar subjects which includes a container and a passage member, such as a glass or plastic tube, extending through an opening in the container, wherein the passage is constructed to resist the escape of the captured subjects. The passage can be constructed to impede the escape of captured subjects by providing a smooth-walled surface inclined so that the exterior opening of the passage is elevated above the interior opening of the passage, whereby subjects attempting to escape slip on the smooth-walled surface and are urged downwardly into the container by the inclination of the passage. Preferably, the passage is oriented substantially vertically so the effect of gravity is maximized. The passage surface can be further slickened to resist gripping contact with the subject by applying a lubricant, such as oil or grease. Escape can be deterred further by applying lubricant to the inside walls of the container.

A variation of the smooth-walled tube trapping means is provided by use of a passage member which is a funnel shaped tube, wherein the exterior opening of the passage is the smaller of the funnel openings. The inverted funnel shape of the passageway further impedes the upward exit of an insect out of the container. A second variation is a funnel shaped tube, which can provide an exterior opening of the passage that is the larger of the funnel openings. The funnel shape of the passageway impedes the upward exit of an insect out of the container by providing a smaller surface area from which to exit.

The passage member can alternatively be provided with a one-way barrier means disposed in the passage to permit the entrance of subjects into the container but resist the escape of subjects. The one-way barrier means is preferably constructed to open towards said interior and automatically close after the passage of a subject.

The one-way barrier means can particularly be constructed by a plurality of wires extending inwardly from a wall surface of the passage towards the interior outlet of the passage. The series of wires separably interleave to form a mesh that resists the subject in an outward direction but separates to permit passage of a subject toward the interior of the container.

The one-way barrier can be alternatively formed of two members biased together at one end either inherently elastically or by other moveable means such as an elastic band encompassing the two members. The two members can be easily separated by a subject between the two members allowing entrance to the container through the resultant opening. A subject within the container is prevented from escape by the subject's inability to separate the biased members. In this configuration, the biased members can be flaps or any other shape allowing a subject to enter between the members from outside the container.

A container cover, which fits snugly over the container opening, is provided with an opening and a grommet to facilitate stationary placement of the tube in the opening of the container and to prevent alternative access to, or egress from, the container via gaps between the tube and the container opening wall.

Although placement of bait inside the container is normally used to attract insects, a pheromone or other suitable insect attractant can be used instead. Use of a suitable container, such as an empty plastic milk jug or a glass jar, allows viewing of the interior of the insect trap. By viewing the contents, the user can thereby know when to replace or clean out the container. Viewing of the trapped insects may also be educational. The contents of the container can be cleaned out at a convenient time and the trap baited again, or, if the user wishes, the container can be disposed of and the trapping means reused with a new container.

The present invention also concerns a method for simply manufacturing a one-way barrier device for use in the passage of a trap. The method generally includes forming a plastic ring with a series of outwardly extending wires and inverting the ring so that the wires are biased into an interleaving configuration.

Thus, the present invention provides a simple, cost effective, easy-to-maintain device for reliably capturing insects, vermin and similar subjects. The present invention also provides a method for a manufacture of the device.

BRIEF DESCRIPTION OF THE DRAWINGS

FIG. 1 is a side view of a preferred embodiment of the invention.

FIG. 2 displays a top view of a retaining ring with a resilient ring and its wires.

DETAILED DESCRIPTION OF PREFERRED EMBODIMENTS

Figure 3:
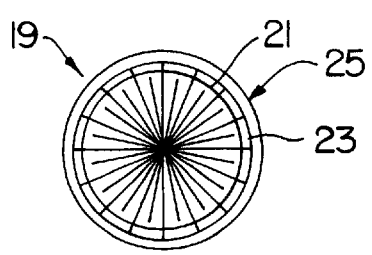
FIG. 3 displays a top view of the retention system shown in FIG. 2 with the resilient ring and its wires in the inverted state.

Referring now to the drawings, and more particularly to FIG. 1, the insect trap (1) of the present invention is designed to fit simply on a readily available container (3), such as a plastic milk or water jug or a mason jar. The container cover (5) positions and holds a smooth-walled tube (7), disposed vertically through an opening (9) in the cover (5) such that the tube (7) extends into the container (3) without touching the interior walls of the container (3). The diameter of the exterior opening of the tube (11) is shown smaller than the diameter of the interior opening (13).

The insect trap (1) can be held stationary by friction with the walls of the container cover opening (9), or a resilient grommet (15) can be used to hold the tube (7) in place. Also displayed in this embodiment is bait (17) placed in the container (3) to attract insects. Not displayed is a thin layer of oil or some other lubricant coating the tube (7) and the interior surface of the container (3).

The retention means (19) and its wires (21) are shown within the body of the tube (11). Not displayed is an annular groove in the interior of the tube (7) into which the retention ring (25) of the retention means (19) securely fits.

FIG. 2 displays a top view of the retention means (19). The intertleaving wires (21) extend from the resilient ring (23). As shown, the retaining ring (25) surrounds the resilient ring (23) but does not engage the resilient ring (23).

FIG. 3 displays the inverted resilient ring (23) and wires (21) biased into the intertleaving configuration by engagement of the retaining ring (25).

Figure 4:
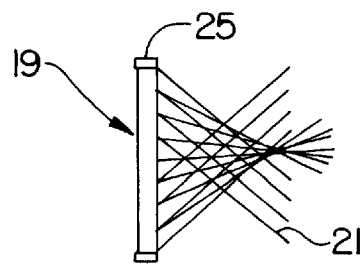
FIG. 4 displays a side view of the retention system exhibiting the interleaving posture of the resilient ring's wires.

FIG. 4 displays a side view of the retention means (19) wherein the conical formation of the interleaving wires (21) in their inverted state is clearly shown.

Figure 5:
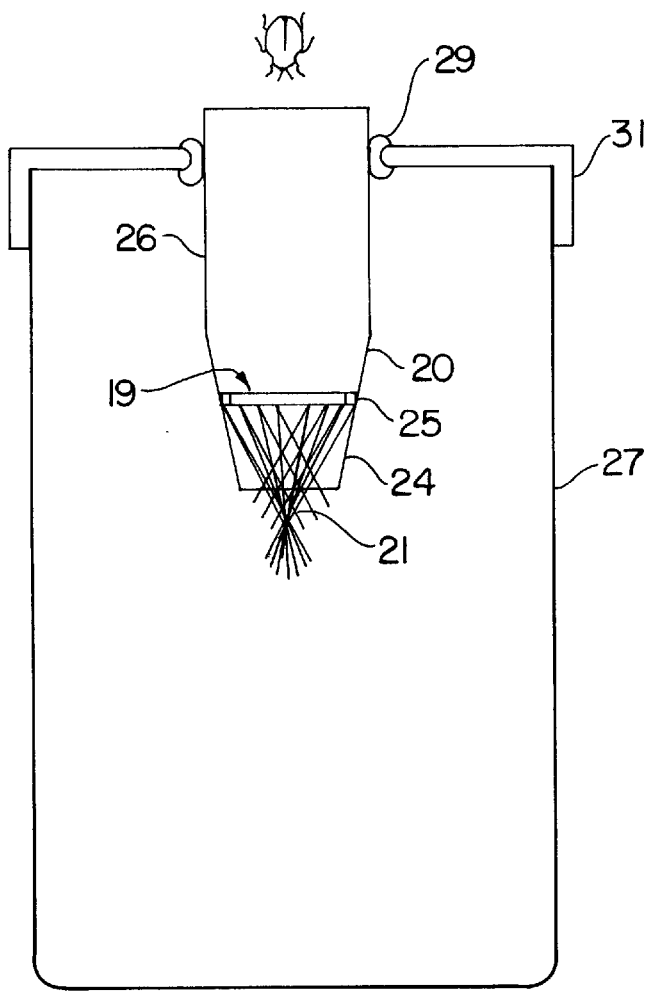
FIG. 5 is a side view of a second embodiment of the invention, including a preferred retention system positioned within a tube.

FIG. 5 exhibits a side view of an embodiment wherein the retention means (19) is positioned in a glass tube (20) in the opening of, for example, a mason jar container (27). In this embodiment, the glass tube (20) is held in place by a grommet (29), which itself is positioned in the opening of the mason jar container cover (31). The tube (20) is funnel shaped, having a conical part (24) disposed inside the mason jar container (27), and a cylindrical upper part (26) which extends through the grommet (29). Not displayed is an annular groove in the interior conical section of the glass tube (20) into which the retention ring (25) of the retention means (19) securely fits.

Figure 7:
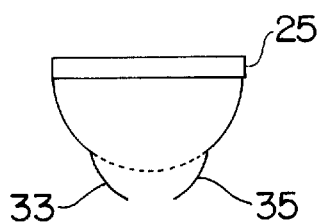
FIG. 7 is a side view of the retention system of FIG. 6 showing the two members in their separated state.
Figure 6:
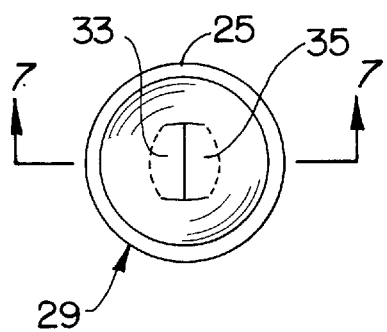
FIG. 6 is a top view of a second embodiment of the preferred retention system having two members movably biased together to allow easy separation upon entrance into the container but difficult separation upon attempted egress out of the container.

FIGS. 6 and 7 display top and side views respectively of an alternative one-way barrier (29) according to the invention. The one-way barrier is formed by two members (33, 35) biased together at one end either inherently elastically or by other moveable means such as an elastic band encompassing the two members (33, 35). The two members (33, 35) can be easily separated by a subject between the two members (33, 35) allowing entrance to the container through the resultant opening. A subject within the container is prevented from escape by inability to separate the biased members. In this configuration, the biased members (33, 35) can be flaps or any other shape allowing a subject to enter between the members from outside the container. In a manner similar to the retention means (19), the one-way barrier (29) can be retained in the tube (7, 20) by a retention ring (25).

Although the description of this invention has been given with reference to particular embodiments, this description should not be construed as limiting the scope of this invention. Many variations and modifications may now occur to those skilled in the art in view of this disclosure. Accordingly, the scope of the present invention should not be determined by the above description, but rather by a reasonable interpretation of the appended claims.

I claim:

1. A trap for insects, vermin and similar subjects comprising:
   a container having an opening;
   a passage member extending through said opening into said container and defining a passage having an interior passage wall surface, an exterior inlet and an interior outlet; and
   a one-way barrier disposed in said passage, whereby captured subjects are inhibited from escaping said container by climbing out through said passage, wherein said one-way barrier opens towards said interior outlet to permit passage of subjects through said interior outlet into said container and automatically closes after passage of the subjects, wherein said one-way barrier includes a plurality of wires extending inwardly from said interior passage wall surface towards said interior outlet, said plurality of wires separably interleaving to prevent the escape of subjects out of said container, wherein said plurality of wires extend from a support band securely connected to said interior passage wall surface, wherein said wires extend from the inner circumference of said support band towards each other in an interleaved relationship, said wires being biased towards said support band and prevented from reaching an unbiased position by the interleaved relationship, whereby the biased, interleaved state of said wires maintains the one-way barrier in a securely closed position after being opened to receive the subject.

2. The trap according to claim 1, wherein said one-way barrier has a lubricant coating upon said interior passage wall surface.

3. The trap according to claim 1, further comprising a cap member removably attached to said container opening, said cap member having an opening to permit said passage member to extend therethrough.

4. The trap according to claim 3, wherein said container is a plastic milk jug and said cap member is a milk jug cap.

5. The trap according to claim 1, wherein said exterior inlet is disposed substantially vertically above said interior outlet, whereby the effect of gravity upon the subject to force ingress to said container is maximized.

6. The trap according to claim 1, wherein the diameter of said exterior inlet of said passage is less than the diameter of said interior outlet of said passage, thereby forming an out-wardly tapering passage towards the interior of said container.

7. The trap according to claim 1, wherein the diameter of said exterior inlet of said passage is greater than the diameter of said interior outlet of said passage, thereby forming an inwardly tapering passage towards the interior of said container.

8. The trap according to claim 1, wherein said one-way barrier further comprises said support band being inverted from a first outward state in which said plurality of wires integrally formed around the outer circumference of said support band are oriented in an outward, horizontal direction, to a second state in which said wires are oriented around the inner circumference of said support band and biased for an interleaved configuration.

* * * * *